US012804552B2

(12) United States Patent
Raghavan et al.

(10) Patent No.: US 12,804,552 B2
(45) Date of Patent: Nov. 17, 2026

(54) TIME-VARYING EFFECTIVE ISOTROPIC RADIATED POWER (EIRP) MASK SPECIFICATIONS

(71) Applicant: QUALCOMM Incorporated, San Diego, CA (US)

(72) Inventors: Vasanthan Raghavan, West Windsor Township, NJ (US); Mustafa Emara, Munich (DE); Michael Alexander Ruder, Pommelsbrunn (DE); Marco Papaleo, Bologna (IT)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 18/478,900

(22) Filed: Sep. 29, 2023

(65) Prior Publication Data

US 2025/0113307 A1 Apr. 3, 2025

(51) Int. Cl.
*H04W 52/18* (2009.01)

(52) U.S. Cl.
CPC .................................... *H04W 52/18* (2013.01)

(58) Field of Classification Search
CPC ..... H04W 52/18; H04L 1/0026; H04L 1/0029
See application file for complete search history.

(56) References Cited

U.S. PATENT DOCUMENTS

| | | | | |
|---|---|---|---|---|
| 9,325,398 | B2 * | 4/2016 | Negus | H01Q 1/246 |
| 10,320,471 | B1 * | 6/2019 | Panthi | H04B 7/18513 |
| 10,587,332 | B2 * | 3/2020 | Lemme | H01Q 21/00 |
| 10,791,561 | B2 * | 9/2020 | Raghavan | H04B 7/0617 |
| 11,153,830 | B2 * | 10/2021 | Rico Alvarino | H04W 52/247 |
| 11,659,404 | B2 * | 5/2023 | Schwengler | H04L 5/0048 370/329 |
| 11,848,730 | B2 * | 12/2023 | Raghavan | H04B 7/0404 |
| 11,863,276 | B2 * | 1/2024 | Hirzallah | H04B 17/101 |
| 11,917,420 | B2 * | 2/2024 | Flesch | H04L 67/52 |
| 12,255,720 | B2 * | 3/2025 | Hirzallah | H04B 17/101 |
| 12,375,195 | B2 * | 7/2025 | Wang | H04B 17/102 |

(Continued)

FOREIGN PATENT DOCUMENTS

| | | | | |
|---|---|---|---|---|
| CN | 109714828 B | 7/2023 | | |
| EP | 2282420 B1 * | 10/2016 | | H04B 7/18586 |

(Continued)

OTHER PUBLICATIONS

International Search Report and Written Opinion—PCT/US2024/044313—ISA/EPO—Feb. 6, 2025.

(Continued)

*Primary Examiner* — Hai V Nguyen
(74) *Attorney, Agent, or Firm* — ArentFox Schiff LLP

(57) ABSTRACT

Aspects of the disclosure are directed to a first network entity configured for wireless communication. In some examples, the first network entity includes one or more memories, individually or in combination, having instructions, and one or more processors, individually or in combination, configured to execute the instructions and cause the first network entity to output, for transmission to a second network entity, a first message configuring the second network entity with effective isotropic radiated power (EIRP) metrics to be applied to wireless communications between the second network entity and one or more user equipments (UEs).

19 Claims, 13 Drawing Sheets

(56) References Cited

U.S. PATENT DOCUMENTS

| | | | | |
|---|---|---|---|---|
| 12,400,134 | B2 * | 8/2025 | Sud | H04K 3/94 |
| 12,501,320 | B2 * | 12/2025 | Grant | H04L 5/0041 |
| 12,556,265 | B2 * | 2/2026 | Raghavan | H04B 7/18513 |
| 12,597,972 | B2 * | 4/2026 | Raghavan | H04B 7/0617 |
| 2014/0237547 | A1 * | 8/2014 | Bose | H04W 12/08 726/3 |
| 2015/0215029 | A1 * | 7/2015 | Lemme | H01Q 21/00 342/359 |
| 2016/0212624 | A1 * | 7/2016 | Mueck | H04W 72/56 |
| 2016/0268677 | A1 * | 9/2016 | Lemme | H04B 7/18513 |
| 2020/0077411 | A1 * | 3/2020 | Raghavan | H04B 7/0617 |
| 2021/0051595 | A1 * | 2/2021 | Rico Alvarino | H04W 52/283 |
| 2021/0251002 | A1 * | 8/2021 | Sun | H04W 16/14 |
| 2022/0141673 | A1 * | 5/2022 | Flesch | H04W 52/243 370/329 |
| 2022/0345261 | A1 * | 10/2022 | Ali | H04L 5/0044 |
| 2023/0044736 | A1 * | 2/2023 | Testa | H04W 16/10 |
| 2023/0082337 | A1 * | 3/2023 | Desai | H04L 12/10 370/254 |
| 2023/0085595 | A1 * | 3/2023 | Hirzallah | H04B 17/101 370/329 |
| 2023/0198584 | A1 * | 6/2023 | Raghavan | H04B 7/063 375/262 |
| 2023/0344533 | A1 * | 10/2023 | Wang | H04B 17/102 |
| 2024/0007180 | A1 * | 1/2024 | Raghavan | H04B 7/18513 |
| 2024/0023154 | A1 * | 1/2024 | Raghavan | H04W 72/541 |
| 2024/0088979 | A1 * | 3/2024 | Hirzallah | H04B 17/101 |
| 2024/0196431 | A1 * | 6/2024 | Hirzallah | H04W 24/08 |
| 2024/0276398 | A1 * | 8/2024 | Desai | H04W 52/367 |
| 2024/0396602 | A1 * | 11/2024 | Raghavan | H04B 7/0617 |
| 2025/0113309 | A1 * | 4/2025 | Raghavan | H04B 17/102 |
| 2025/0317736 | A1 * | 10/2025 | Strater | H04W 12/63 |
| 2025/0321320 | A1 * | 10/2025 | Jeon | G01S 7/021 |
| 2026/0005777 | A1 * | 1/2026 | Raghavan | H04B 17/102 |
| 2026/0039565 | A1 * | 2/2026 | Gajic | H04L 41/14 |

FOREIGN PATENT DOCUMENTS

| | | | | |
|---|---|---|---|---|
| EP | 3687247 A1 * | 7/2020 | | H04W 12/69 |
| WO | WO-2023204557 A1 * | 10/2023 | | H04W 52/367 |
| WO | WO-2024226027 A1 * | 10/2024 | | H04B 17/102 |

OTHER PUBLICATIONS

Partial International Search Repor—PCT/US2024/044313—ISA/EPO—Dec. 16, 2024.

* cited by examiner

TIME-VARYING EFFECTIVE ISOTROPIC RADIATED POWER (EIRP) MASK SPECIFICATIONS

BACKGROUND

Technical Field

The present disclosure generally relates to communication systems, and more particularly, to time-varying effective isotropic radiated power (EIRP) mask specifications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus configured for wireless communication, including: one or more memories, individually or in combination, having instructions; and one or more processors, individually or in combination, configured to execute the instructions and cause the apparatus to: output, for transmission to a first network entity, a first message configuring the first network entity to apply effective isotropic radiated power (EIRP)

metrics to wireless communications between the first network entity and one or more user equipments (UEs); and output, for transmission to a second network entity, a second message indicating the EIRP metrics.

In some aspects, the techniques described herein relate to an apparatus configured for wireless communication, including: one or more memories, individually or in combination, having instructions; and one or more processors, individually or in combination, configured to execute the instructions and cause the apparatus to: obtain, from a first network entity, a message indicating effective isotropic radiated power (EIRP) metrics to be applied by a second network entity to wireless communications between the second network entity and one or more user equipments (UEs); and measure a strength of a signal transmitted from the second network entity, wherein the wireless communications include the signal.

In some aspects, the techniques described herein relate to an apparatus configured for wireless communication, including: one or more memories, individually or in combination, having instructions; and one or more processors, individually or in combination, configured to execute the instructions and cause the apparatus to: obtain, from a first network entity or a second network entity, a message indicating effective isotropic radiated power (EIRP) metrics; apply the EIRP metrics to wireless communications between the apparatus and one or more user equipments (UEs); and obtain, from the second network entity, parameters indicative of at least a measurement period during which the wireless communications between the apparatus and the one or more UEs are measured based on the EIRP metrics.

In some aspects, the techniques described herein relate to a method of wireless communication at an apparatus, comprising: outputting, for transmission to a first network entity, a first message configuring the first network entity to apply effective isotropic radiated power (EIRP) metrics to wireless communications between the first network entity and one or more user equipments (UEs); and outputting, for transmission to a second network entity, a second message indicating the EIRP metrics.

In some aspects, the techniques described herein relate to a method of wireless communication at an apparatus, comprising: obtaining, from a first network entity, a message indicating effective isotropic radiated power (EIRP) metrics to be applied by a second network entity to wireless communications between the second network entity and one or more user equipments (UEs); and measuring a strength of a signal transmitted from the second network entity, wherein the wireless communications include the signal.

In some aspects, the techniques described herein relate to a method of wireless communication at an apparatus, comprising: obtaining, from a first network entity or a second network entity, a message indicating effective isotropic radiated power (EIRP) metrics; applying the EIRP metrics to wireless communications between the apparatus and one or more user equipments (UEs); and obtaining, from the second network entity, parameters indicative of at least a measurement period during which the wireless communications between the apparatus and the one or more UEs are measured based on the EIRP metrics.

In some aspects, the techniques described herein relate to an apparatus configured for wireless communication, comprising: means for outputting, for transmission to a first network entity, a first message configuring the first network entity to apply effective isotropic radiated power (EIRP) metrics to wireless communications between the first network entity and one or more user equipments (UEs); and means for outputting, for transmission to a second network entity, a second message indicating the EIRP metrics.

In some aspects, the techniques described herein relate to an apparatus configured for wireless communication, comprising: means for obtaining, from a first network entity, a message indicating effective isotropic radiated power (EIRP) metrics to be applied by a second network entity to wireless communications between the second network entity and one or more user equipments (UEs); and means for measuring a strength of a signal transmitted from the second network entity, wherein the wireless communications include the signal.

In some aspects, the techniques described herein relate to an apparatus configured for wireless communication, comprising: means for obtaining, from a first network entity or a second network entity, a message indicating effective isotropic radiated power (EIRP) metrics; means for applying the EIRP metrics to wireless communications between the apparatus and one or more user equipments (UEs); and means for obtaining, from the second network entity, parameters indicative of at least a measurement period during which the wireless communications between the apparatus and the one or more UEs are measured based on the EIRP metrics.

In some aspects, the techniques described herein relate to a non-transitory computer-readable medium comprising instructions that, when executed by one or more processors, are configured to cause the one or more processors to perform operations comprising: outputting, for transmission to a first network entity, a first message configuring the first network entity to apply effective isotropic radiated power (EIRP) metrics to wireless communications between the first network entity and one or more user equipments (UEs); and outputting, for transmission to a second network entity, a second message indicating the EIRP metrics.

In some aspects, the techniques described herein relate to a non-transitory computer-readable medium comprising instructions that, when executed by one or more processors, are configured to cause the one or more processors to perform operations comprising: obtaining, from a first network entity, a message indicating effective isotropic radiated power (EIRP) metrics to be applied by a second network entity to wireless communications between the second network entity and one or more user equipments (UEs); and measuring a strength of a signal transmitted from the second network entity, wherein the wireless communications include the signal.

In some aspects, the techniques described herein relate to a non-transitory computer-readable medium comprising instructions that, when executed by one or more processors, are configured to cause the one or more processors to perform operations comprising: obtaining, from a first network entity or a second network entity, a message indicating effective isotropic radiated power (EIRP) metrics; applying the EIRP metrics to wireless communications between the apparatus and one or more user equipments (UEs); and obtaining, from the second network entity, parameters indicative of at least a measurement period during which the wireless communications between the apparatus and the one or more UEs are measured based on the EIRP metrics.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
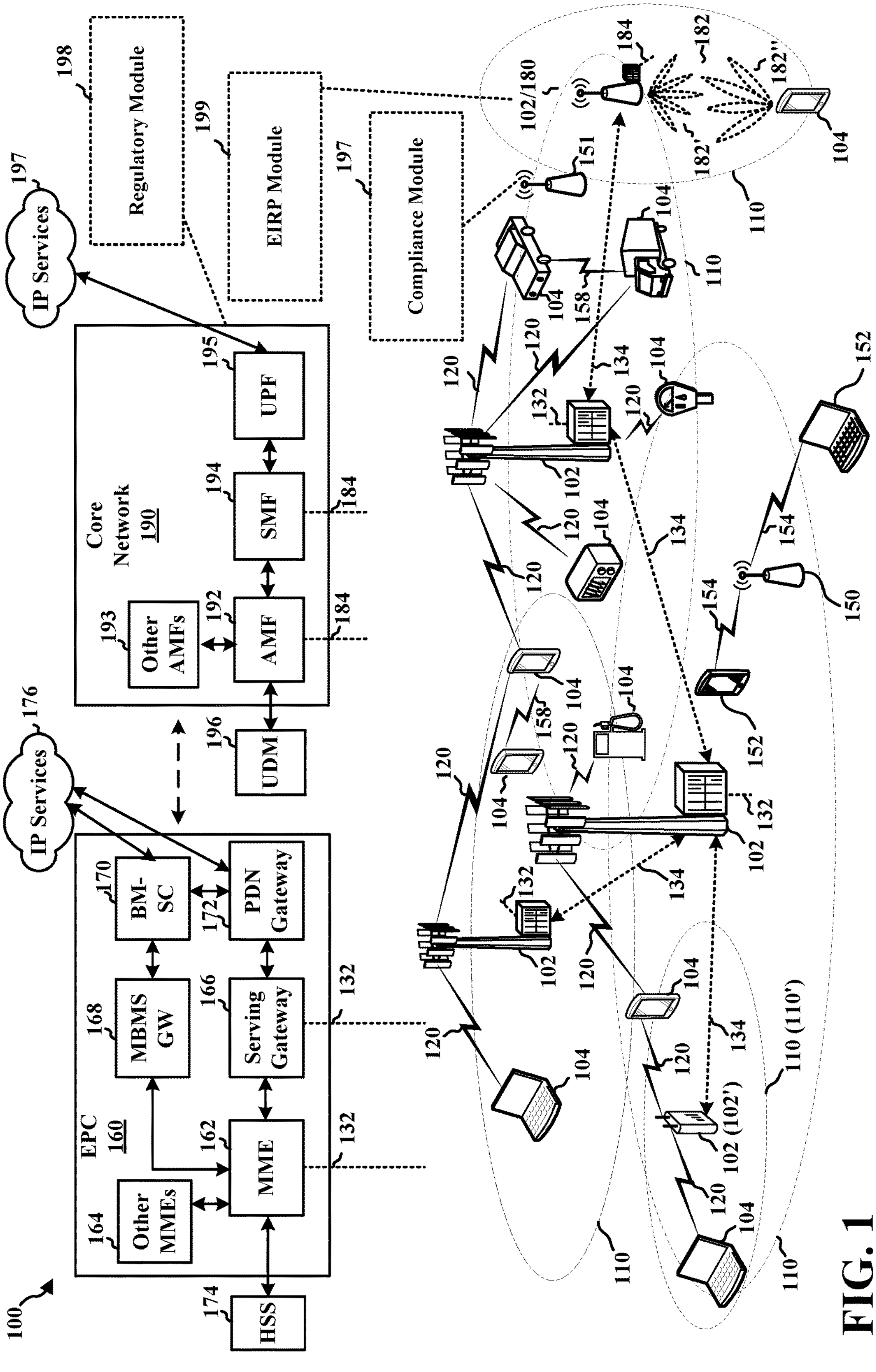
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Spectrum sharing between wireless devices (e.g., terrestrial and satellite) may be a key aspect of interest for sixth generation (6G) system deployment. Spectrum sharing may be especially critical for frequencies within the FR3 range between 7.125-24.25 GHz due to intermediate frequencies (IF) of circuitry operating in the FR2 range (24.25-52.6 GHz) falling within the FR3 range. Further, wireless signal radiation can often leak into unintended frequency bands. Such radiation may result in significant interference leading to loss in resilience, safety issues, and otherwise poor performance of affected wireless devices. For example, there have been reports of cellular signal radiation leakage (e.g., cellular services operating up to 3.98 GHz) causing problems in the 3.7-4.2 GHz frequency range (e.g., C-band) used by aircraft radio altimeters (RAs). Cellular radiation leakage has been reported to interfere with such aircraft instruments causing problems with flight-critical instruments. Similar issues have been observed at millimeter wave (mmW) carrier frequencies that use large antenna arrays (e.g., arrays having ≥64 antenna elements at a base station, customer premises equipment (CPE), and the like).

As such, aspects of the disclosure are directed to apparatus and methods for improving spectrum sharing between various wireless networks and their respective devices, such as terrestrial networks and air-to-ground (ATG) networks. For example, minimizing or eliminating interference experienced at ATG base station (e.g., serving users in an aircraft) caused by terrestrial networks. It should be noted that the apparatus and methods for improving spectrum sharing described herein are not limited to spectrum sharing between terrestrial and ATG networks, but may be implemented in any suitable environment.

Effective isotropic radiated power (EIRP) relates to a measurement of radiated output power of an antenna. In some examples, an "EIRP mask" may be implemented on one or more devices of a network to control or limit the radiated power of a device to mitigate interference. In one example, an EIRP mask may be defined and enforced by regulatory authorities, such as the Federal Communications Commission (FCC) in the United States or equivalent agencies in other countries. The EIRP mask may set limits on the maximum or average allowable radiated power from a transmitting antenna array to prevent interference with other wireless devices and/or networks and to improve spectrum efficiency. Thus, when transmission power is below the EIRP mask limits, interference at other devices is minimized.

However, such EIRP masks are static, meaning that the mask may define a fixed and predetermined limit on a maximum allowable EIRP level over a specific angle (e.g., elevation or altitude) for a particular wireless network and/or device within a frequency band. Accordingly, the limit does not change based on dynamic factors such as location, time, and/or network conditions. As such, an EIRP mask capable of changing dynamically according to one or more factors may improve spectrum efficiency. For example, a wireless network and/or device configured with a static EIRP mask would be required to transmit at a reduced power level whether another device that could experience interference from that wireless network is in the environment or not. Here, a transmission power limit imposed by the static EIRP mask could reduce spectrum efficiency if there is no threat of interfering with another device or network.

In certain aspects, the disclosure is directed to time varying EIRP masks. For example, a wireless device may be configured with multiple EIRP masks each corresponding to a particular time window or duration. In this example, a first EIRP mask could provide a first EIRP limit that the wireless device may use during a first window of time, and a second EIRP mask that provides a second EIRP limit that the wireless device may use during a second window of time. The first EIRP limit may be relatively conservative, meaning that the EIRP limit is lower relative to the second EIRP limit. Thus, the first EIRP mask may be implemented during a time window (e.g., first time window) when there is a high amount of wireless traffic, while the second EIRP mask may be implemented during the second time window when there is a relatively lower amount of wireless traffic.

In certain aspects, a wireless device may be configured with multiple EIRP masks that are frequency dependent. For example, the wireless device may be configured to use a different EIRP mask for each operational frequency within a band or a sub-band. In some examples, the frequency-dependent EIRP masks may also include time-varying EIRP masks. Thus, the wireless device may use one of multiple different EIRP masks for a particular frequency spectrum depending on a current time.

It should be noted when a wireless device is configured with a static EIRP mask, that wireless device may be tested to determine whether the device complies with the EIRP mask configuration. Typically, such tests are performed prior to deploying the device. However, if a device is configured to dynamically use EIRP masks (e.g., time varying and/or frequency dependent), such testing may be overly complicated and/or costly in terms of money and time. As such, certain aspects are directed to an intermediate node that may perform EIRP compliance testing on a deployed wireless device.

For example, the intermediate node may configure a wireless device or network with beamforming parameters (e.g., time resources and/or frequency resources) that the wireless device or network may use during its wireless communication operations. The intermediate node may then measure the received signal strengths and—from these—estimate the EIRP levels of transmissions from the wireless device or network to determine whether that wireless device or network is complying with the dynamic use of EIRP masks.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The wireless communication system may also include an intermediate node 151 configured to perform EIRP compliance testing on a deployed wireless node. For example, the intermediate node 151 may configure a wireless node or network with beamforming parameters (e.g., time resources and/or frequency resources) that the wireless device or network may use during its wireless communication operations. The intermediate node may then measure the EIRP levels of transmissions from the wireless node or network to determine whether that wireless device or network is complying with the dynamic use of EIRP masks.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2-1 (24.25 GHz-52.6 GHz). The frequencies between FR1 and FR2-1 are often referred to as mid-band frequencies. Although a portion of FR1 is greater than 7 GHZ, FR1 is often referred to (interchangeably) as a "sub-7 GHz" band in various documents and articles. A similar nomenclature issue sometimes occurs with regard to FR2-1, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-7 GHz" or the like if used herein may broadly represent frequencies that may be less than 7 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2-1, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path, penetration and blockage losses and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity of the base station.

Referring again to FIG. 1, the core network 190 may include a regulatory module 198. As described in more detail elsewhere herein, the regulatory module 198 may be configured to output, for transmission to a first network entity, a first message configuring the first network entity to apply effective isotropic radiated power (EIRP) metrics to wireless communications between the first network entity and one or more user equipments (UEs); and output, for transmission to a second network entity, a second message indicating the EIRP metrics. Additionally, or alternatively, the regulatory module 198 may perform one or more other operations described herein.

The base station 102/180 may include an EIRP module 199. As described in more detail elsewhere herein, the EIRP module may be configured to obtain, from a first network entity or a second network entity, a message indicating effective isotropic radiated power (EIRP) metrics; apply the EIRP metrics to wireless communications between the apparatus and one or more user equipments (UEs); and obtain, from the second network entity, parameters indicative of at least a measurement period during which the wireless communication between the apparatus and the one or more UEs are measured based on the EIRP metrics. Additionally, or alternatively, the EIRP module 199 may perform one or more other operations described herein.

The intermediate node 151 may include a compliance module 197. As described in more detail elsewhere herein, the compliance module may be configured to obtain, from a first network entity, a message indicating effective isotropic radiated power (EIRP) metrics to be applied by a second network entity to wireless communications between the second network entity and one or more user equipments (UEs); and measure a strength of a signal transmitted from the second network entity, wherein the wireless communications comprise the signal. Additionally, or alternatively, the compliance module 199 may perform one or more other operations described herein.

Figures 2A, 2B, 2C, 2D:
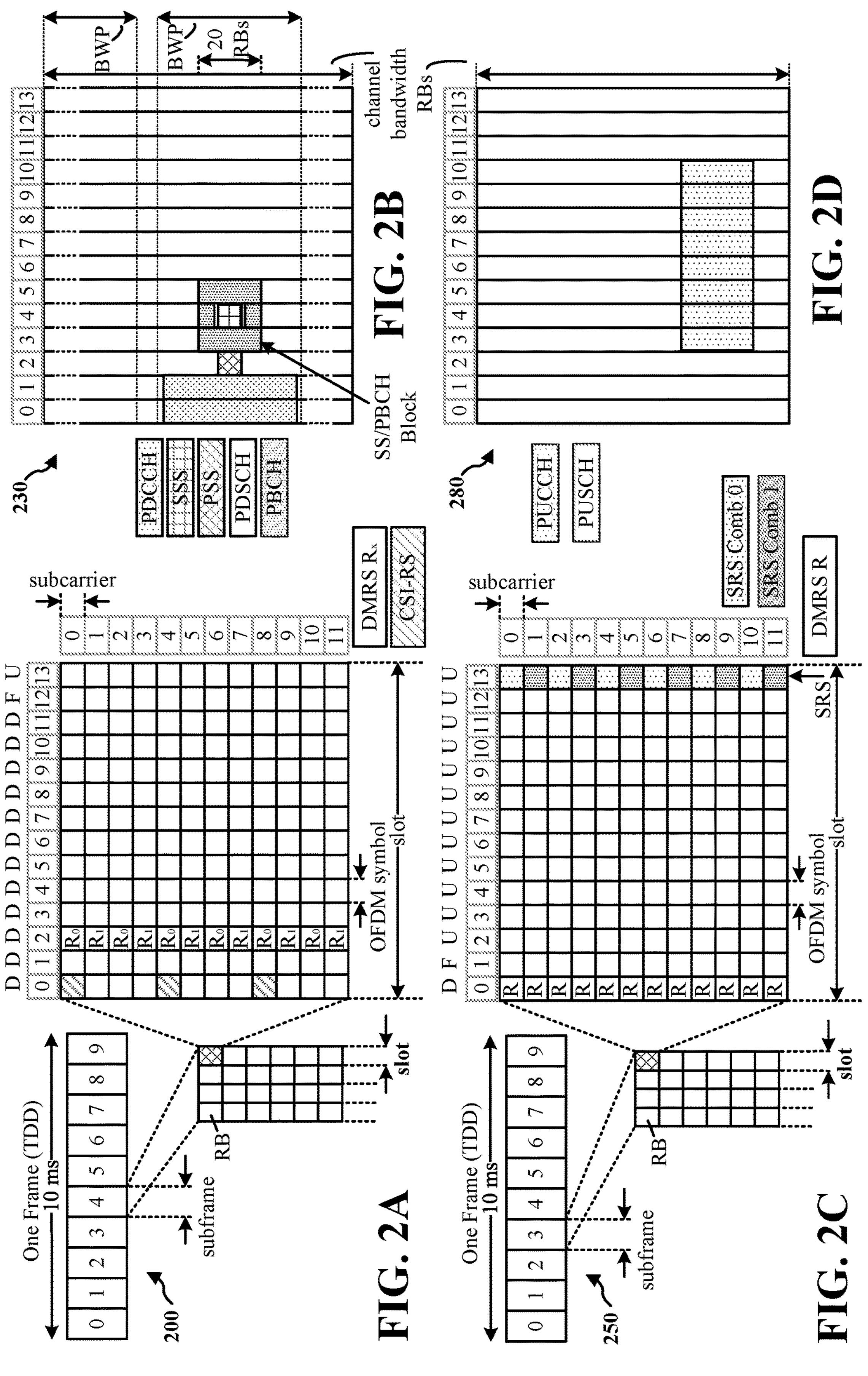
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
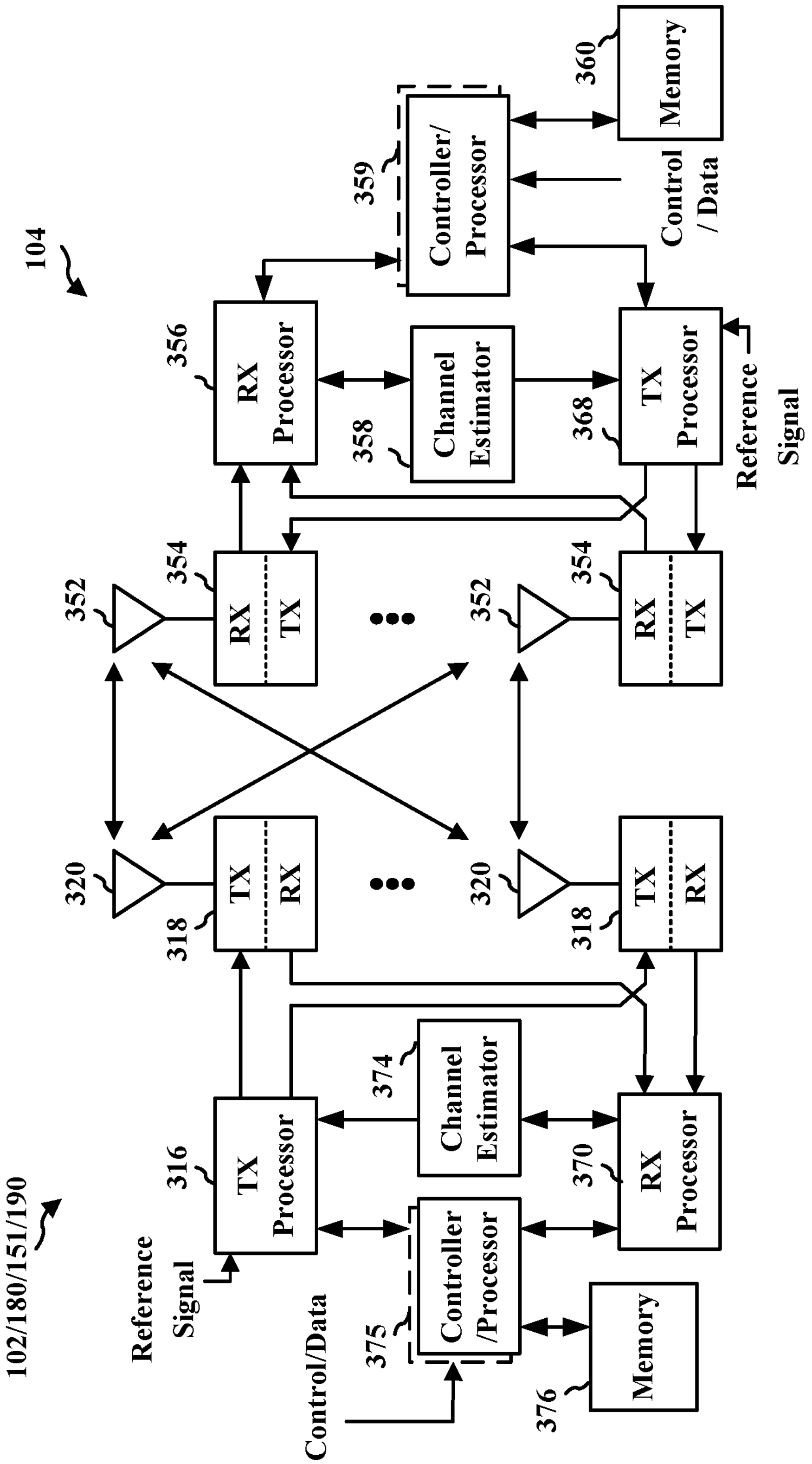
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to one or more controller/processors 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical 1 channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 197, 198, and 199 of FIG. 1.

Figure 4:
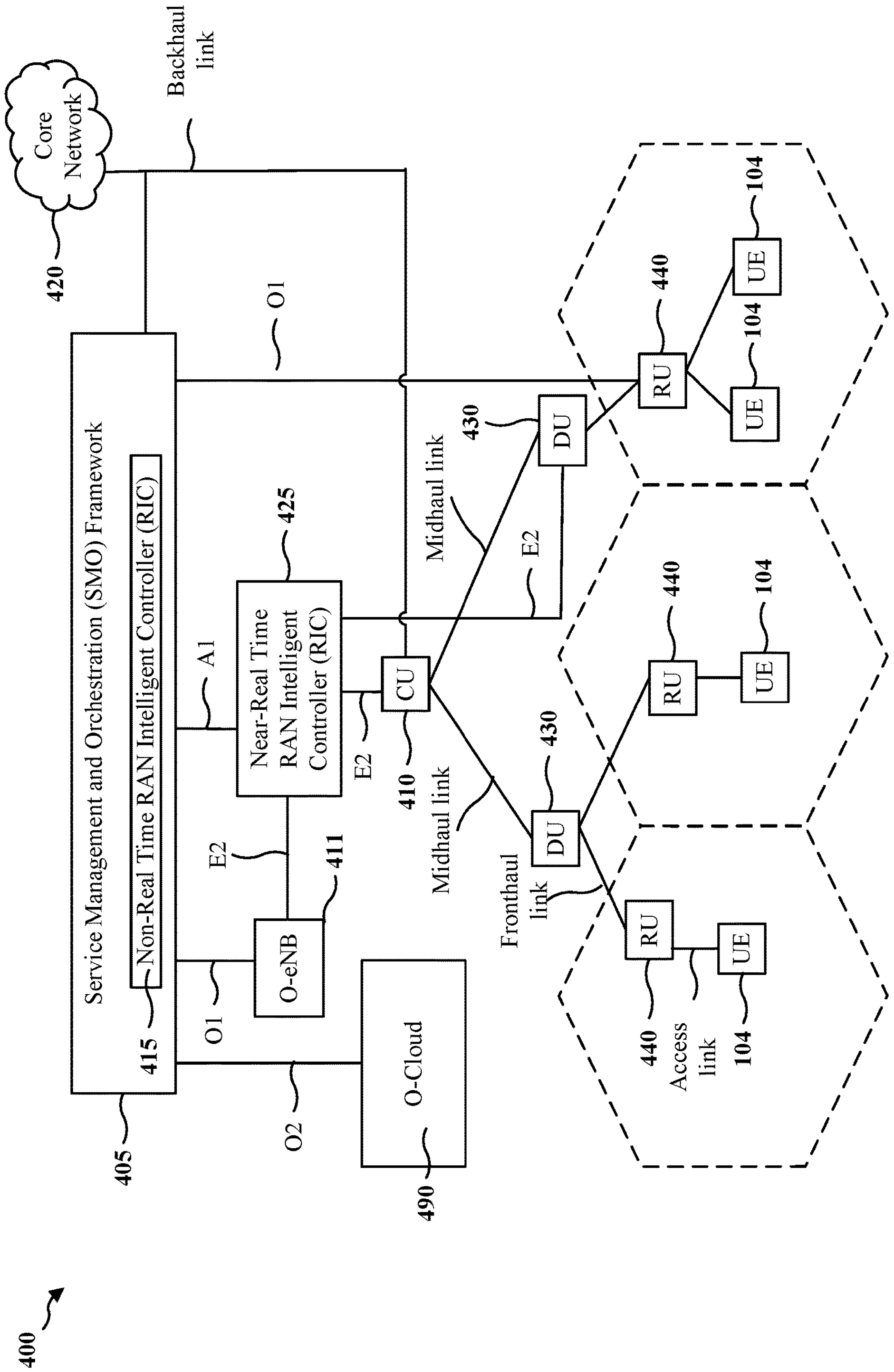
FIG. 4 is a block diagram illustrating an example disaggregated base station 400 architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs

425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Introduction to Effective Isotropic Radiated Power (EIRP) Masks

Figure 5:
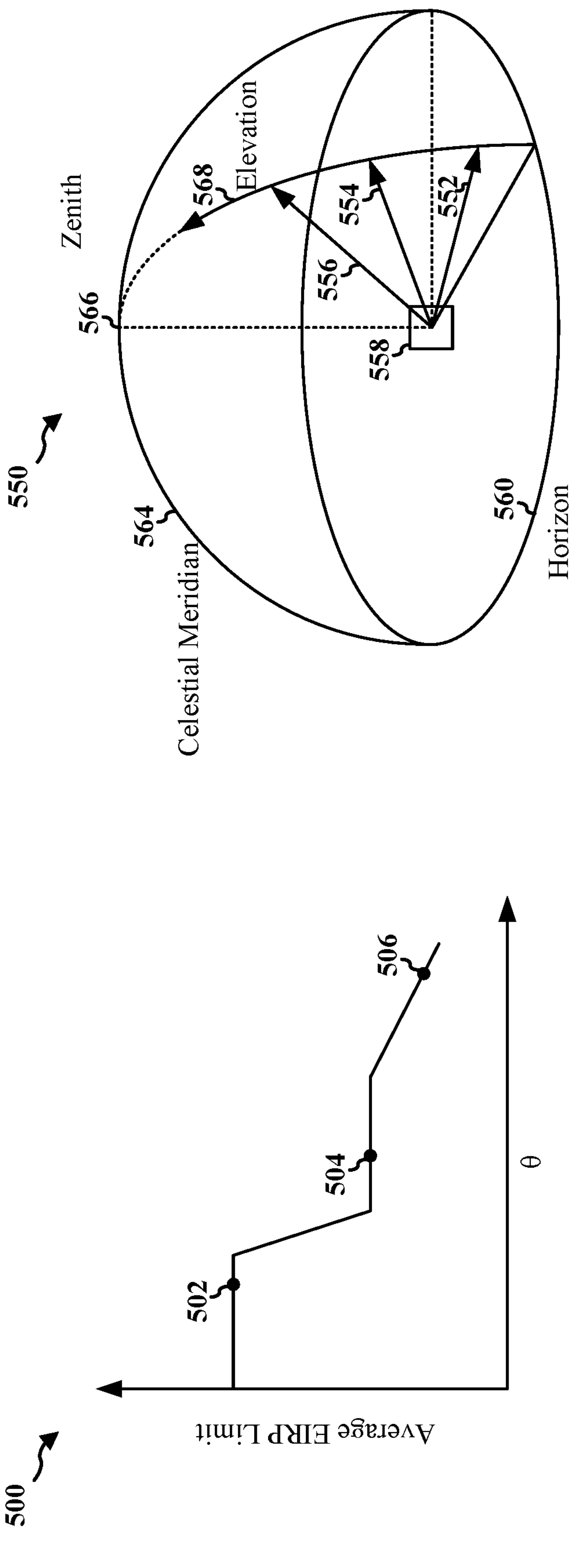
FIG. 5 includes a line graph illustrating an example effective isotropic radiated power (EIRP) mask and a horizontal coordinate system showing an example of elevation angles corresponding to the EIRP mask values.

A static EIRP mask may be used to set fixed average EIRP limits for wireless devices based on beam steering angles in the elevation domain, relative to the horizon/ground level/another suitable plane. Typically, regulatory authorities or standards organizations may define static EIRP masks for specific frequency bands and types of coexisting wireless services (e.g., Wi-Fi, cellular, satellites, military, etc.). These masks specify the maximum or instantaneous allowable EIRP for beamforming transmissions with different elevation steering angles. Here, "elevation" (or "θ" as illustrated in FIG. 5) may refer to a steering angle of a transmit beam relative to the ground level. Elevation angles may include elevation/altitude angles (e.g., relative to the ground level), azimuth angles, and any other suitable angles.

Different types of EIRP masks may be used within the aspects of this disclosure. For example, average-level EIRP masks and instantaneous-level EIRP masks may be used. A wireless node using an average-level EIRP mask may compute an average EIRP of its transmissions using the time-domain averages and the azimuth angle averages. The wireless node may use these average values to determine whether its transmissions comply with regulatory EIRP level requirements. Here, wireless node transmissions can instantaneously exceed EIRP limits as long as the average falls below the limits. Conversely, a wireless node may use instantaneous-level EIRP masks that prevent the wireless node from exceeding EIRP limits at all points in time. Here, each transmission beam used for transmitting a signal may not exceed an EIRP limit associated with the elevation angle at which the beam is directed/steered.

FIG. 5 includes a line graph illustrating an example EIRP mask 500 and a horizontal coordinate system 550 showing an example of elevation angles corresponding to the EIRP mask 500 values. The y-axis of the EIRP mask 500 line graph is representative of an average EIRP value that increases in the direction of the arrow, and the x-axis is representative of an elevation angle ("θ") that increases in the direction of the arrow relative to a ground level or plane.

The horizontal coordinate system 550 shows a network entity 558 (e.g., base station) in the center of a horizontal plane or "horizon" 560. A celestial meridian 564 having a zenith 566 is illustrated to show various angles (e.g., first elevation angle 552, second elevation angle 554, third elevation angle 556) of elevation 568 relative to the horizon 560.

The line plot of the EIRP mask 500 includes three example points indicative of an average EIRP limit and a corresponding elevation angle. These average EIRP limits indicate an average EIRP limit for a particular elevation angle of a transmission beam originating from the network entity 558. A first point 502 corresponds to the first elevation angle 552 which is characterized by a relatively low elevation angle of a transmission beam. Because the first elevation angle 552 is such a small angle, the average EIRP limit is at its highest. A second point 504 corresponds to the second elevation angle 554 which is characterized by a higher elevation angle relative to the first elevation angle 552. Because the second elevation angle 554 is higher, the average EIRP limit lower. A third point 506 corresponds to the third elevation angle 556 which is characterized by a high elevation angle of a transmission beam. Because the third elevation angle 556 is higher than both the first and second elevation angles, the average EIRP limit is close to its lowest value.

Note that the EIRP mask 500 is a static mask having average EIRP limits that do not change based on dynamic factors such as location, time, or network conditions. As such, the EIRP mask 500 may not allow a network entity 558 to alter its transmission power even as the dynamic factors change.

Examples of Dynamic Effective Isotropic Radiated Power (EIRP) Masks

Figure 6:
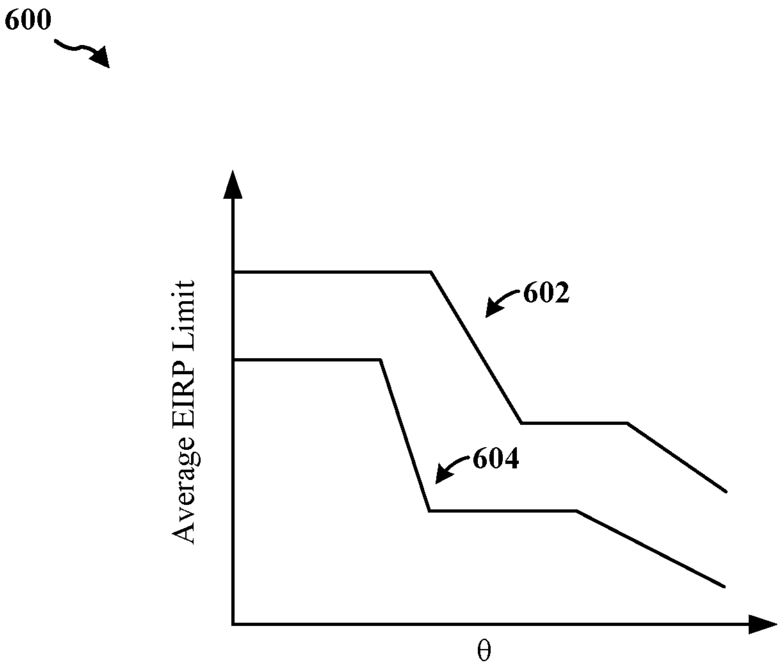
FIG. 6 a line graph illustrating multiple example EIRP masks.

FIG. 6 a line graph illustrating multiple example EIRP masks 600. A first EIRP mask 602 is shown relative to a second EIRP mask 604. The first EIRP mask 602 has an overall higher average EIRP limit (and is hence less stringent) than the second EIRP mask 604 (which is more stringent) at any given elevation angle. Although only two EIRP masks are illustrated, any number of EIRP masks greater than 1 may form a set of EIRP masks.

In certain aspects, a network entity (e.g., a core network entity and/or RAN network entity such as a base station) and/or a regulatory body may create a set of multiple EIRP masks and configure a wireless node with the set so that the wireless node may dynamically switch between different EIRP masks during deployment.

In some examples, one or more of the different EIRP masks may each be configured to be used during a certain window of time. For example, the wireless node may only be allowed to use a first EIRP mask 602 during evening hours when there is less network traffic, while the second EIRP mask 604 may be used during daytime hours when the network traffic is expected to be higher. In another example, the first EIRP mask may be used during weekdays in a shopping mall, whereas a second EIRP mask may be used during weekends in the same setting. During times of high wireless communication traffic, spectral interference due to radiation leakage (e.g., where a wireless signal leaks into unintended frequency channels) may cause other devices to experience interference. For example, if the wireless node is a terrestrial device such as a base station, transmissions having a high elevation angle may cause aircraft or satellites to experience wireless communication interference. Thus, during high traffic times, the wireless node may be configured to use the second EIRP mask 604 which employs a relatively lower EIRP limit, thereby reducing wireless node transmission power and reducing or eliminating spectral interference. On the other hand, when wireless communication traffic is lower, the wireless node may switch to the first EIRP mask 602 because the relatively higher average EIRP limit may not pose a significant threat of interfering with other wireless communication devices.

In some examples, the time-varying factor may be based on events. For example, during a special event (e.g., Super Bowl), the wireless node may be configured to use a less stringent EIRP mask (e.g., first EIRP mask 602 instead of the second EIRP mask 604) for the duration of the special event. In another example, a natural disaster may reduce operational terrestrial cellular networks, thereby causing heavy reliance on satellite communications. In this example, any remaining wireless node operating in the terrestrial cellular network may be configured to use a more stringent EIRP mask (e.g., the second EIRP mask 604) in order to reduce or eliminate potential interference with satellite communications.

In the above examples, the wireless node may switch between different EIRP masks on a time-varying basis. However, other dynamic factors such as location of the wireless node, the frequency(ies) or bands used by the wireless node, and/or wireless traffic conditions around the wireless node may be used in addition or alternatively to time-varying factors. Time-varying factors may also be subject to regulatory or governmental guidance.

In some examples, one or more of the different EIRP masks may each be configured to be used for a particular frequency band. Here, EIRP masks may be created according to wireless communication traffic over different frequency bands and/or the degree to which wireless transmission via a particular frequency band poses a threat of causing interference for other wireless devices. For example, if the wireless node operates in a frequency band with a ceiling of 3.98 GHz, transmissions within that range may include radiation leakage into the 4.2-4.4 GHz range, which is the range used by aircraft radio altimeters. Thus, the wireless node that operates in a frequency band with a ceiling of 3.98 GHz may be configured to use an EIRP mask with a relatively low average EIRP limit (e.g., the second EIRP mask 604) to reduce the threat of interfering with aircraft equipment, especially as the elevation angle of wireless node transmission beams increases. On the other hand, if the wireless node operates in a frequency range that is not close to the neighbor frequency bands of other wireless devices, then the wireless node may instead use an EIRP level with a relatively higher average EIRP limit (e.g., the first EIRP mask 602).

In some examples, the wireless node may be configured with multiple sets of EIRP masks. For example, a first set of multiple EIRP masks may be configured for transmit beams that transmit signals in a first frequency range (e.g., FR1), where each of the multiple masks is configured to be used during a certain window of time. A second set of multiple EIRP masks may be configured for transmit beams that transmit signals in a second frequency range (e.g., FR2-1), where each of the multiple masks is configured to be used during a certain window of time. The wireless node may be configured to use any suitable number of sets of EIRP masks.

One or more EIRP masks of a set of EIRP masks may include one or more of average-level EIRP masks and/or instantaneous-level EIRP masks. In some examples, the wireless node may use an average-level EIRP mask or an instantaneous-level EIRP mask based on whether the wireless node is using discrete Fourier transform (DFT)-based codebook beamforming or multi-beam beamforming vectors (e.g., transmission beams having multiple comparable main lobes).

In some examples, a network entity (e.g., a regulatory body, core network node, base station, or a government entity) may communicate EIRP requirement changes to the wireless node. For example, the wireless node may receive an indication of an EIRP requirement change, and based on the change, the wireless node may switch to an EIRP mask that regulates transmissions within the new requirements.

Examples of Wireless Node Compliance Testing

When a wireless node is configured with a static EIRP mask, that wireless node may be tested to determine whether it complies with the requirements of the EIRP mask configuration. Typically, such tests are performed prior to deploying the wireless node. However, if the wireless node is configured to dynamically use EIRP masks (e.g., time varying and/or frequency dependent), such testing may be overly complicated and/or costly in terms of money and time for low-cost deployments. Accordingly, aspects are directed to an intermediate infrastructure node specifically (or by means of specific application) configured to test the compliance of wireless nodes configured to dynamically switch between EIRP masks.

Figure 7:
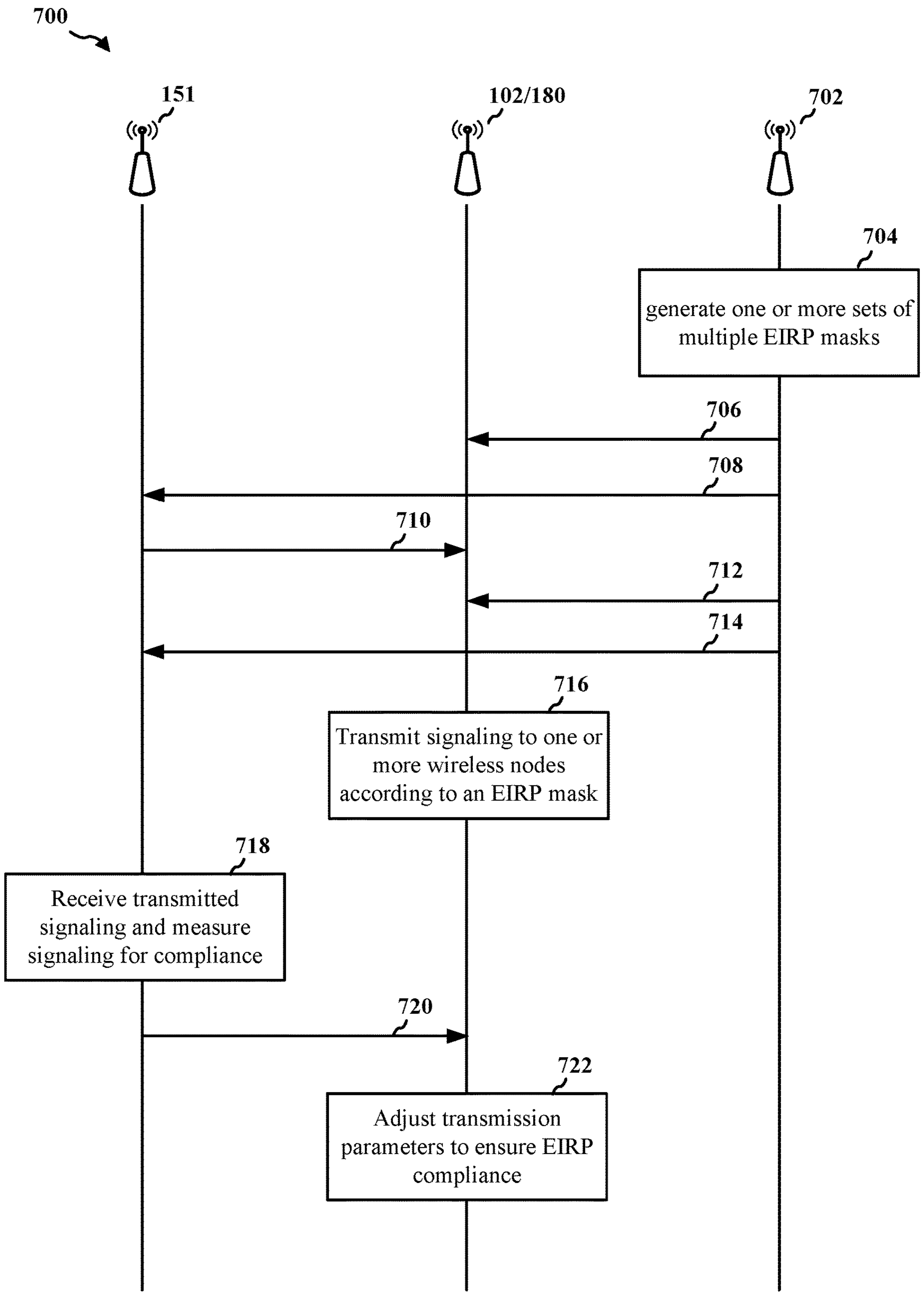
FIG. 7 is a call-flow diagram illustrating an example signaling protocol between a regulatory body, an intermediate node, and a network entity.

FIG. 7 is a call-flow diagram illustrating an example signaling protocol between a regulatory body 702, an intermediate node 151, and a network entity 102 (e.g., network entity 558) configured to dynamically switch between EIRP masks according to one or more dynamic factors.

At a first process 704, the regulatory body 702 may generate one or more sets of multiple EIRP masks. Each of the multiple EIRP masks of a set may be associated with a dynamic factor, such as a time window, a frequency band, location of the network entity, and any other suitable factor.

At an optional first communication 706, the regulatory body 702 may transmit a message that includes an indication of the one or more sets of multiple EIRP masks. Thus, the regulatory body 702 may configure the network entity 102 with multiple EIRP masks that the network entity 102 may use to dynamically switch between (e.g., the network entity 102 may dynamically apply different EIRP masks at different times and/or frequencies). Alternatively, at a third communication 708, the regulatory body 702 may transmit the indication of the one or more sets of multiple EIRP masks to the intermediate infrastructure node 151. Then, at a third communication 710, the intermediate node 151 may transmit an indication of multiple EIRP masks to the network entity 102 and any other wireless nodes that the intermediate node 151 is configured to monitor.

At a fourth communication 712, the regulatory body 702 may transmit an indication of the EIRP metrics to the network entity 102. In some examples, the EIRP metrics may include at least one of a time-dependent EIRP metric, a frequency-dependent EIRP metric, an average-type EIRP metric, an instantaneous-type EIRP metric, an operational deployment metric associated with the network entity's functioning such as an indication of a disaster period, an operation constraint, etc., an indication of one or more beams (e.g., beamforming vectors, codewords, etc.), an indication of one or more elevation angles, and/or an indication of one or more beam weights such as the use of DFT or multi-beam vectors for transmissions. The EIRP metrics may provide an indication of which beam directions and elevation angles the intermediate node 151 is configured to monitor. The network entity 102 may use the EIRP metrics to determine which of the multiple EIRP masks it can use at a given time and/or frequency so that the network entity's 102 transmissions comply with EIRP requirements of the regulatory body. In some examples, the regulatory body 702 may use the fourth communication 712 to transmit updated EIRP metrics (e.g., EIRP metrics that have changed relative to previously provided EIRP metrics) to the intermediate node 151 as well as the network entity 102. This is because the network entity 102 has to ensure that its transmissions comply with the new EIRP requirements (whatever has been indicated to it). Otherwise, the network entity may be in violation of a requirement for compliance aspects.

At a fifth communication 714, the regulatory node 702 may provide the same EIRP metrics of the fourth communication 712 to the intermediate node 151. The intermediate node 151 may use the EIRP metrics to determine which EIRP masks the network node 102 may be using at a given time so that the intermediate node 151 can measure transmissions from the network entity 102 and determine whether the transmissions comply with the EIRP requirements of current EIRP mask used by the network entity 102.

At a second process 716, the network entity 102/180 may transmit signaling, via one or more transmit beams, to one or more wireless nodes according to an EIRP mask. For example, the network entity 716 may determine which EIRP mask to use for its transmissions based on a current time and/or frequency band used for the transmissions. The transmissions may be any transmissions used by the network entity 102 to communicate with one or more wireless nodes (e.g., UEs and/or other network entities).

At a third process 718, the intermediate node 151 may receive the signaling transmitted by the network entity 102 during the second process 716 and measure the signaling to determine whether the network entity 102 is using elevation angles and corresponding transmission power that comply with the EIRP mask used by the network entity 102. It should be noted that the intermediate node 151 may perform the measurements over a period of time, and the network entity 102 may dynamically switch between multiple different EIRP masks within that period of time. The intermediate node 151, having been configured with the multiple EIRP masks and EIRP metrics by the regulatory body 702, may determine whether the network entity 102 is transmitting in compliance with the multiple EIRP masks during the period of time.

In some examples, if the intermediate node 151 determines that the network entity 102 is in compliance or is not in compliance with appropriate EIRP requirements for a given time and/or frequency, then the intermediate node may generate a report. At a sixth communication 720, the intermediate node 151 may transmit the report to the network entity 102 and/or the regulatory body 702.

At a fourth process 722, if the network entity 102 receives a report indicating that it is not in compliance with applicable EIRP requirements, or if the network entity 102 determines that it needs to reduce its transmit power to comply with applicable EIRP requirements, then the network entity 102 may adjust its transmission parameters to ensure EIRP compliance as described in the examples below.

In one example, the network entity 102 may perform transmission beam nulling by inserting nulls in a beam radiation pattern in a direction of interference caused by a transmit beam. Such nulling may be used by the network entity 102 to suppress unwanted spatial emissions of a particular beam at a particular elevation angle to reduce interference caused by that beam. Thus, the network entity 102 may reduce transmission power of a certain direction (e.g., elevation angle). In some examples, the network entity 102 may control a weight of each antenna element of the network entity 102 to maximize SINR for terrestrial wireless nodes while also suppressing side lobes of the transmission beam that have elevation angles above the horizon.

In another example, or as an alternative to beam nulling and suppression of side lobes, the network entity 102 may perform beam tapering or transmission amplitude weighting (e.g., phase shift and/or amplitude control). Here, the network entity 102 may suppress side lobe transmission power levels to a given power level by weighting the amplitude across each antenna element. In this example, the network entity 102 may generate beams by determining a particular transmission strength of the main lobe relative to a side lobe of the same beam.

In another example, the network entity may implement certain beam restrictions to reduce transmit power and ensure EIRP compliance. Here, the network entity 102 may restrict the angular range of transmit beams so that interference caused by beams pointing in those directions is limited. For example, the network entity 102 may implement such restrictions by performing a power back-off of beams having a certain direction or elevation angle (e.g., reducing transmit power of certain beams) or eliminating the use of certain beams altogether, to ensure compliance with a current EIRP mask. For codebook-based beamforming, beam weights in the codebook associated with elevation angles directed above the horizon may be disabled so that they are not used for transmission. For reciprocity-based beamforming, the network entity 102 may make changes to beam weights to avoid transmitting in directions above the horizon and/or side lobes directed toward other wireless nodes that are experiencing interference from the network entity 102.

In another example, the network entity may control antenna elements to create irregular/sparse array geometries. Here, the network entity may turned on/off certain antenna elements to introduce an artificial offset control. As such, the transmit power associated with side lobe directions having elevation angles over the horizon may be reduced.

Figure 8:
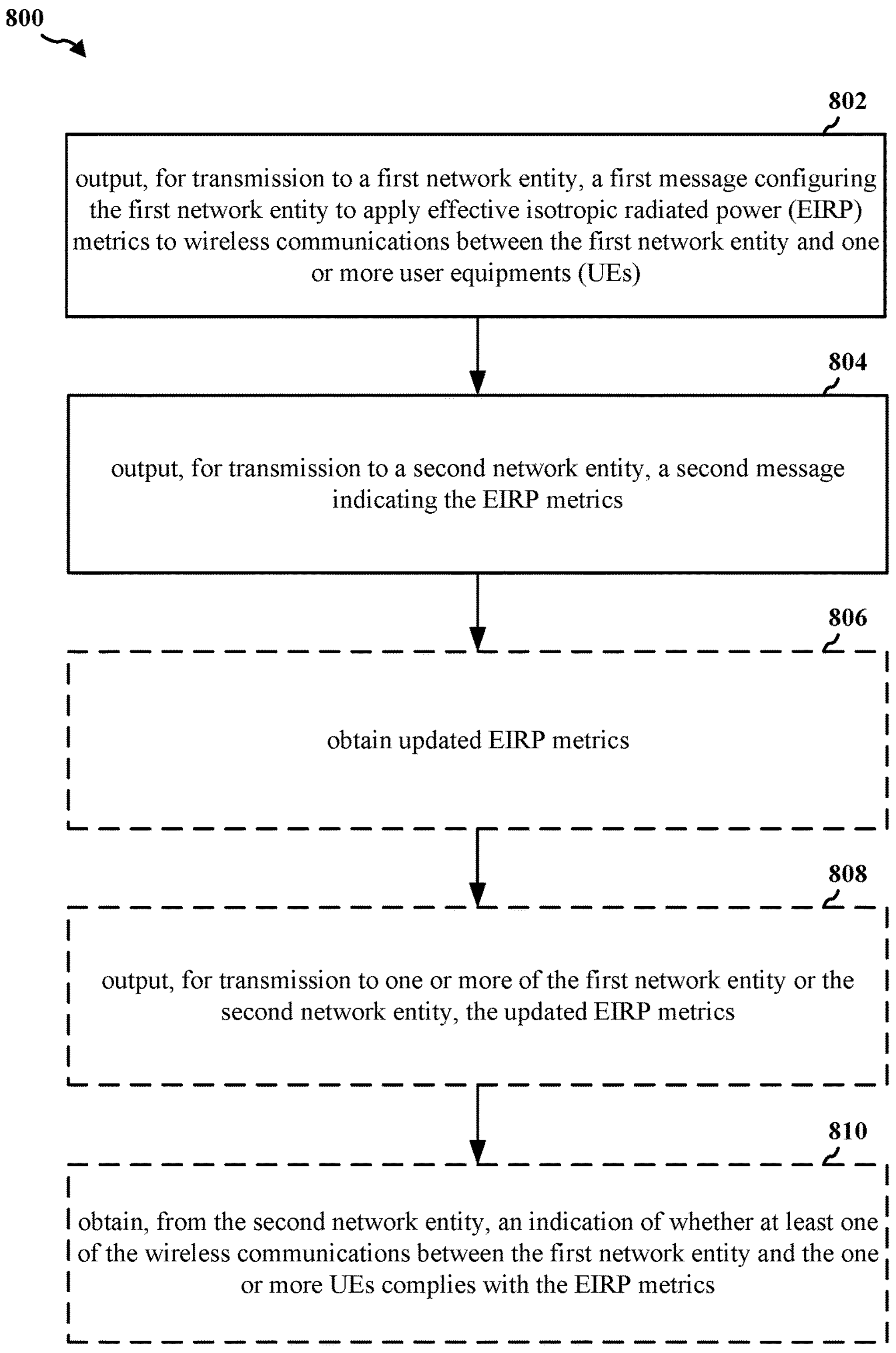
FIG. 8 is a flowchart of a method of wireless communication.

FIG. 8 is a flowchart 800 of a method of wireless communication. The method may be performed by an apparatus (e.g., a regulatory body, core network 190 node, government entity; apparatus 902). Specifically, the method may be performed by one or more processors (e.g., controller/processor 375 of FIG. 3, cellular baseband processor 904 of FIG. 9, etc.).

At 802, the apparatus may output, for transmission to a first network entity, a first message configuring the first network entity to apply effective isotropic radiated power (EIRP) metrics to wireless communications between the first network entity and one or more user equipments (UEs). For example, 802 may be performed by an outputting component 940 of FIG. 9, as illustrated at 706 and 712 of FIG. 7. Here, the apparatus may configure the second network entity (e.g., base station 102/180) with multiple EIRP masks. The EIRP metrics may include an indication of whether each mask is a time-dependent EIRP mask, a frequency-dependent EIRP mask, an average-type EIRP mask, an instantaneous-type EIRP mask, or an operational deployment associated with the second network entity's functioning (e.g., one or more beams are switched off resulting in a temporary suspension of transmissions).

In some examples, the EIRP metrics include a first set of EIRP metrics associated with a first frequency range, and second set of EIRP metrics associate with a second frequency range. That is, one or more EIRP masks may be configured for use by the second network entity in FR2-1, while another one or more EIRP masks may be configure for use in FR3. Thus, some of the EIRP masks may only be used in certain frequencies.

In some examples, the EIRP metrics include a first set of EIRP metrics associated with a first time window, and a second set of EIRP metrics associated with a second time window. For example, one or more EIRP masks may be used within certain time frames, while another one or more EIRP masks may be used within other time frames. For example, a base station me use a first EIRP mask on weekdays, and a second EIRP mask on weekends. In another example, a more lenient EIRP mask may be used during a special event, and a less lenient EIRP mask may be used during hours outside the special event.

At 804, the apparatus may output, for transmission to a second network entity, a second message indicating the EIRP metrics. For example, 804 may be performed by the outputting component 940, as illustrated at 708 and 714 of FIG. 7. Here, the apparatus may transmit an indication of the EIRP metrics to the third network entity (e.g., an intermediate infrastructure node) so that the node knows what output transmission power to expect from the base station while it monitors the base station. The intermediate node may be configured to monitor the base station to ensure that base station transmissions are in compliance with an EIRP mask that the base station is currently using.

At 806, the apparatus may optionally obtain updated EIRP metrics. For example, 806 may be performed by an obtaining component 942. Here, the apparatus may receive an updated one or more EIRP masks, or an additional one or more EIRP masks for distribution to one or more base stations and/or intermediate nodes. For example, a user may update the EIRP metrics and provide the updated metrics to the apparatus to send out to the base station and intermediate node.

At 808, the apparatus may optionally output, for transmission to one or more of the first network entity or the second network entity, the updated EIRP metrics. For example, 808 may be performed by the outputting component 940. Here, the apparatus may transmit an indication of the updated EIRP metrics to the base station and/or the intermediate node.

Finally, at 810, the apparatus may optionally obtain, from the second network entity, an indication of whether at least one of the wireless communications between the first network entity and the one or more UEs complies with the EIRP metrics. For example, 810 may be performed by the obtaining component 942. Here, the intermediate node may determine that the base station is not within compliance of one or more EIRP masks. In some examples, the intermediate node may generate and transmit a report to the apparatus. In some examples, noncompliance may result in a financial penalty and/or loss of licensing.

Figure 9:
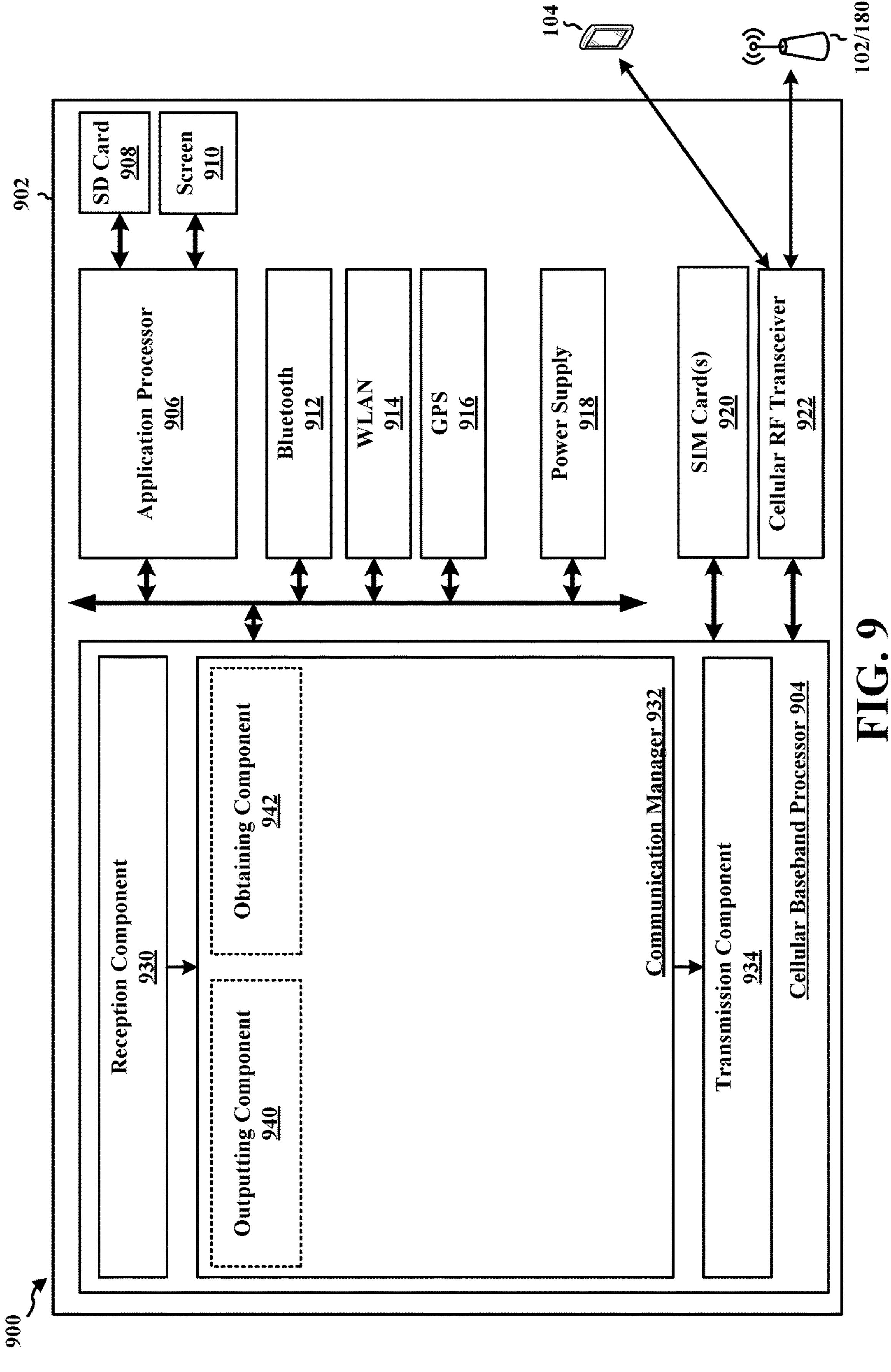
FIG. 9 is a diagram illustrating an example of a hardware implementation for an apparatus.

FIG. 9 is a diagram 900 illustrating an example of a hardware implementation for an apparatus 902. The apparatus 902 is, for example, a regulatory body, core network 190 node, government entity) and includes a baseband unit 904. The baseband unit 904 may communicate through a cellular RF transceiver with one or more of a base station 102/180, an intermediate node 151, and/or a UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the apparatus and may include the memory 376 and/or at least one of the TX processor 316, the RX processor 370, and the controller/processor 375. In various examples, the apparatus 902 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 932 includes an outputting component 940 configured to: output, for transmission to a first network entity, a first message configuring the first network entity to apply effective isotropic radiated power (EIRP) metrics to wireless communications between the first network entity and one or more user equipments (UEs); output, for transmission to a second network entity, a second message indicating the EIRP metrics; and output, for transmission to one or more of the first network entity or the second network entity, the updated EIRP metrics; e.g., as described in connection with 802, 804, and 808 of FIG. 8.

The communication manager 932 further includes an obtaining component 942 configured to obtain updated EIRP metrics; and obtain, from the second network entity, an indication of whether at least one of the wireless communications between the first network entity and the one or more UEs complies with the EIRP metrics; e.g., as described in connection with 806 and 810.

The apparatus may include additional components that perform each of the blocks of the algorithm in the aforementioned flowchart of FIG. 8. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for outputting, for transmission to a first network entity, a first message configuring the first network entity to apply effective isotropic radiated power (EIRP) metrics to wireless communications between the first network entity and one or more user equipments (UEs); means for outputting, for transmission to a second network entity, a second message indicating the EIRP metrics; means for obtaining updated EIRP metrics; means for outputting, for transmission to one or more of the first network entity or the second network entity, the updated EIRP metrics; means for obtaining, from the second network entity, an indication of whether at least one of the wireless communications between the first network entity and the one or more UEs complies with the EIRP metrics.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In some examples, the means for outputting comprises the TX processor 316, transmitter 318TX, and antenna 320. The means for obtaining comprises the RX processor 370, receiver 318RX, and antenna 320.

Figure 10:
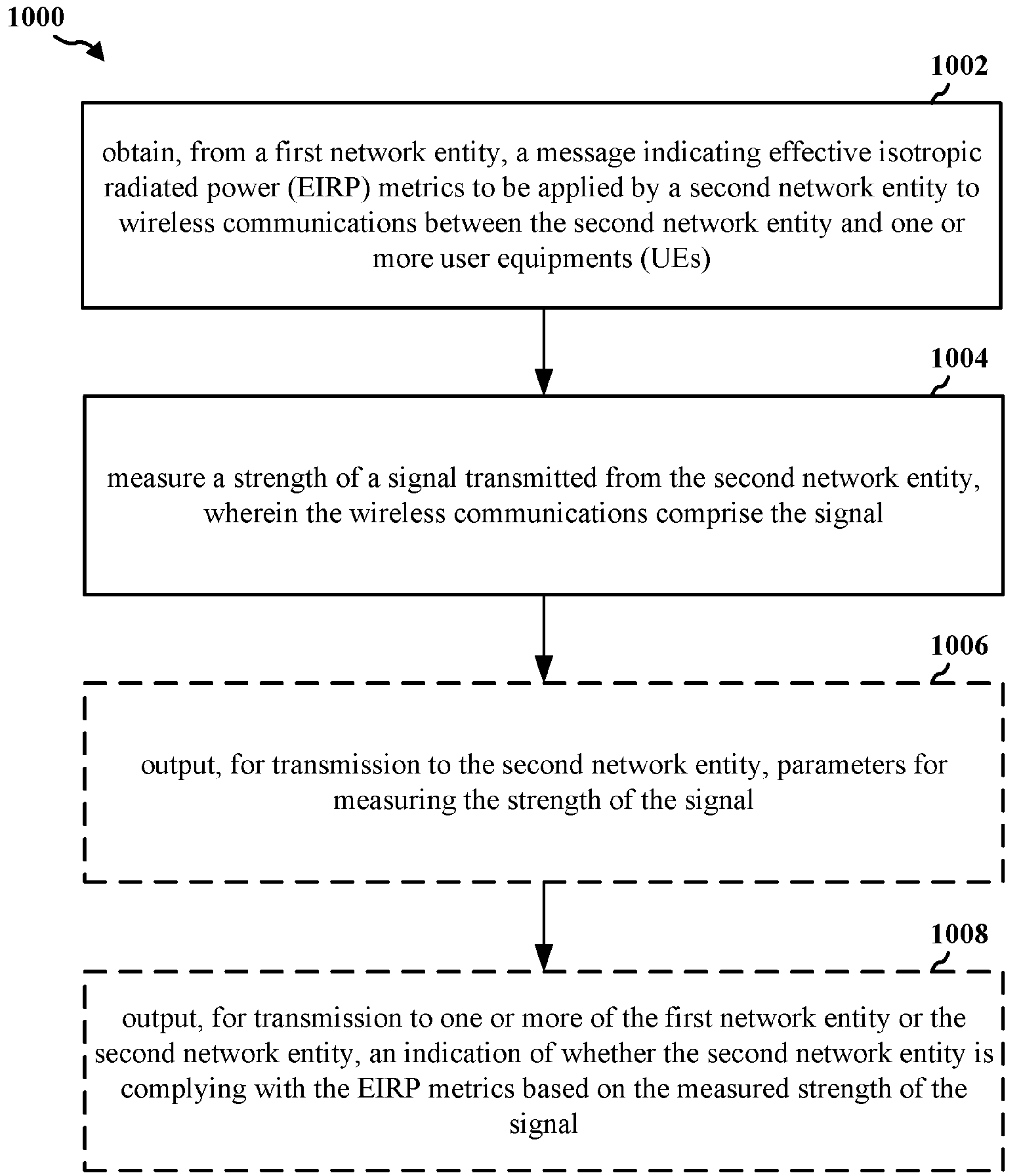
FIG. 10 is a flowchart of a method of wireless communication.

FIG. 10 is a flowchart 1000 of a method of wireless communication. The method may be performed by an apparatus (e.g., intermediate node 151; the apparatus 1102). Specifically, the method may be performed by one or more processors (e.g., controller/processor 375 of FIG. 3, cellular baseband processor 1104 of FIG. 11, etc.).

At 1002, the apparatus may obtain, from a first network entity, a message indicating effective isotropic radiated power (EIRP) metrics to be applied by a second network entity to wireless communications between the second network entity and one or more user equipments (UEs). For example, 1002 may be performed by an obtaining component 1140. Here, a regulatory body (e.g., apparatus 902) may transmit an indication of EIRP metrics (e.g., EIRP masks and related information) to the first network node so that the node knows the EIRP masks of a base station that it is configured to monitor, as shown in 708 and 714 of FIG. 7.

At 1004, the first network node may measure a strength of a signal transmitted from the second network entity, wherein the wireless communications comprise the signal. For example, 1004 may be performed by a measuring component 1142. Here, the first network node may monitor transmission power of a base station to determine whether the base station is operating within the EIRP metrics provided by the regulatory body, as illustrated in 718 of FIG. 7. It should be noted that in some examples, the EIRP metrics may be provided to the apparatus by the base station that is to be monitored.

At 1006, the apparatus may optionally output, for transmission to the second network entity, parameters for measuring the strength of the signal. For example, 1006 may be performed by an outputting component 1144. Here, the apparatus may transmit information including one or more of a measurement period (e.g., a time window during which the apparatus will measure the power of base station transmissions), elevation angles associated with one or beams used by the base station, etc. In certain aspects, the parameters for measuring include an indication of at least one symbol within which the signal is transmitted by the third network entity, and an indication of at least one beamforming vector to be used by the third network entity for transmitting the signal. This is information that the base station may use to ensure that the apparatus can accurately monitor the base station's transmission. In certain aspects, the at least one beamforming vector is defined by a single main lobe in a spatial domain or multiple main lobes in the spatial domain.

At 1008, the apparatus may optionally output, for transmission to one or more of the first network entity or the second network entity, an indication of whether the second network entity is complying with the EIRP metrics based on the measured strength of the signal. For example, 1008 may be performed by the outputting component 1144. Here, the apparatus may transmit a report indicating non-compliance with a EIRP mask to the base station that is not complying and/or the regulatory body.

Figure 11:
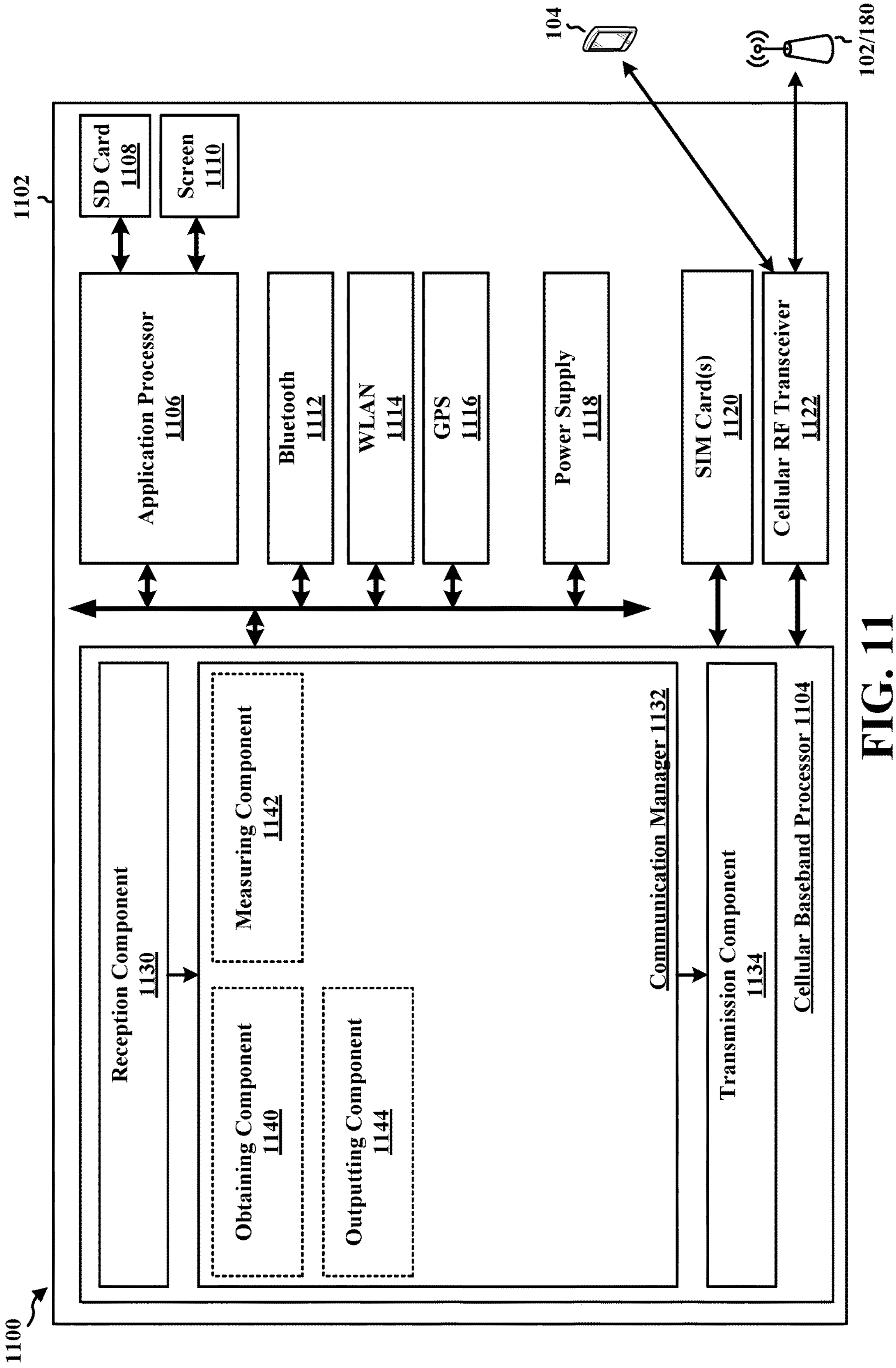
FIG. 11 is a diagram illustrating an example of a hardware implementation for an apparatus.

FIG. 11 is a diagram 1100 illustrating an example of a hardware implementation for an apparatus 1102. The apparatus 1102 is an intermediate node (e.g., intermediate node 151 of FIG. 1) and includes a baseband unit 1104. The baseband unit 1104 may communicate through a cellular RF transceiver with a base station and a regulatory body. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the intermediate node 151 and may include the memory 376 and/or at least one of the TX processor 316, the RX processor 370, and the controller/processor 375. In various examples, the apparatus 1102 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1132 includes an obtaining component 1140 configured to obtain, from a first network entity, a message indicating effective isotropic radiated power (EIRP) metrics to be applied by a second network entity to wireless communications between the second network entity and one or more user equipments (UEs), e.g., as described in connection with 1002.

The communication manager 1132 further includes a measuring component 1142 configured to measure a strength of a signal transmitted from the second network entity, wherein the wireless communications comprise the signal, e.g., as described in connection with 1004.

The communication manager 1132 further includes an outputting component 1144 configured to: output, for transmission to the second network entity, parameters for measuring the strength of the signal; and output, for transmission to one or more of the first network entity or the second network entity, an indication of whether the second network entity is complying with the EIRP metrics based on the measured strength of the signal; e.g., as described in connection with 1006 and 1008.

The apparatus may include additional components that perform each of the blocks of the algorithm in the aforementioned flowchart of FIG. 10. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for obtaining, from a first network entity, a message indicating effective isotropic radiated power (EIRP) metrics to be applied by a second network entity to wireless communications between the second network entity and one or more user equipments (UEs); means for measuring a strength of a signal transmitted from the second network entity, wherein the wireless communications comprise the signal; means for outputting, for transmission to the second network entity, parameters for measuring the strength of the signal; and means for outputting, for transmission to one or more of the first network entity or the second network entity, an indication of whether the second network entity is complying with the EIRP metrics based on the measured strength of the signal.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some examples, the means for outputting may include the TX processor 316, transmitter 318TX, and antenna 320. The means for obtaining may include the RX processor 370, receiver 318RX, and antenna 320. The means for measuring may include one or more controllers/processors 375.

Figure 12:
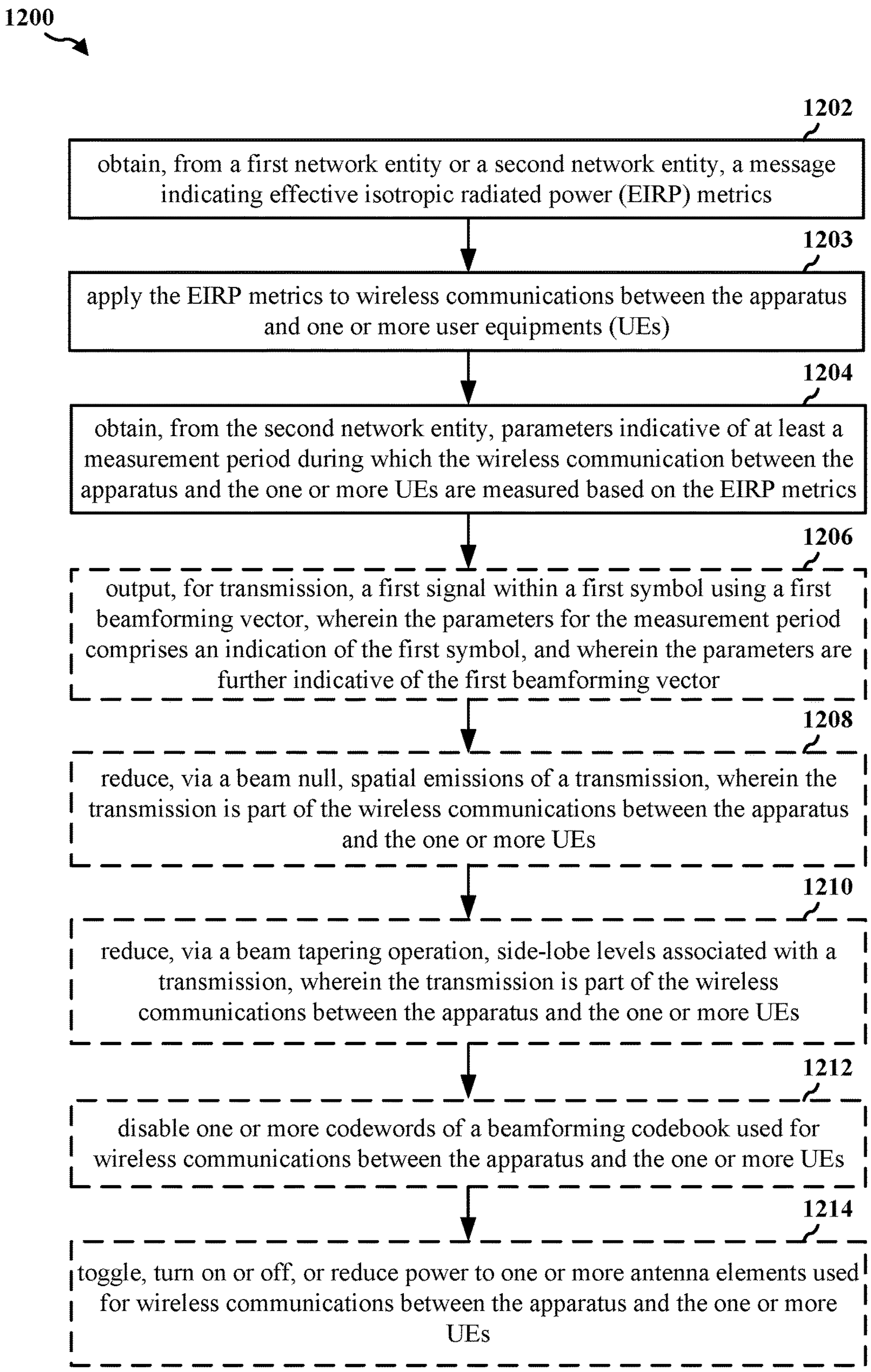
FIG. 12 is a flowchart of a method of wireless communication.

FIG. 12 is a flowchart 1200 of a method of wireless communication. The method may be performed by a base station (e.g., the base station 102/180; the apparatus 1302. Specifically, the method may be performed by one or more processors (e.g., the controller/processors 375 of FIG. 3, the cellular baseband processor 1304 of FIG. 13, etc.).

At 1202, an apparatus (e.g., a base station) may be configured to obtain, from a first network entity or a second network entity, a message indicating effective isotropic radiated power (EIRP) metrics. For example, 1202 may be performed by an obtaining component 1340.

At 1203, the apparatus may be configured to apply the EIRP metrics to wireless communications between the apparatus and one or more user equipments (UEs). For example, 1203 may be performed by an applying component 1350.

At 1204, the apparatus may obtain, from the second network entity, parameters indicative of at least a measurement period during which the wireless communications between the apparatus and the one or more UEs are measured based on the EIRP metrics. For example, 1204 may be performed by the obtaining component 1340.

At 1206, the apparatus may optionally output, for transmission, a first signal within a first symbol using a first beamforming vector, wherein the indication of the measurement period comprises an indication of the first symbol, and wherein the parameters are further indicative of the first beamforming vector. For example, 1206 may be performed by an outputting component 1342.

At 1208, the apparatus may optionally reduce, via a beam null, spatial emissions of a transmission, wherein the transmission is part of the wireless communications between the apparatus and the one or more UEs. For example, 1208 may be performed by a reducing component 1344.

At 1210, the apparatus may optionally reduce, via a beam tapering operation, side-lobe levels associated with a transmission, wherein the transmission is part of the wireless communications between the apparatus and the one or more UEs. For example, 1210 may be performed by the reducing component 1344.

At 1212, the apparatus may optionally disable one or more codewords of a beamforming codebook used for wireless communications between the apparatus and the one or more UEs. For example, 1212 may be performed by a disabling component 1346.

At 1214, the apparatus may optionally toggle between, turn on, turn off, or reduce power to antenna elements used for wireless communications between the apparatus and the one or more UEs. For example, 1214 may be performed by a toggling component 1348.

Figure 13:
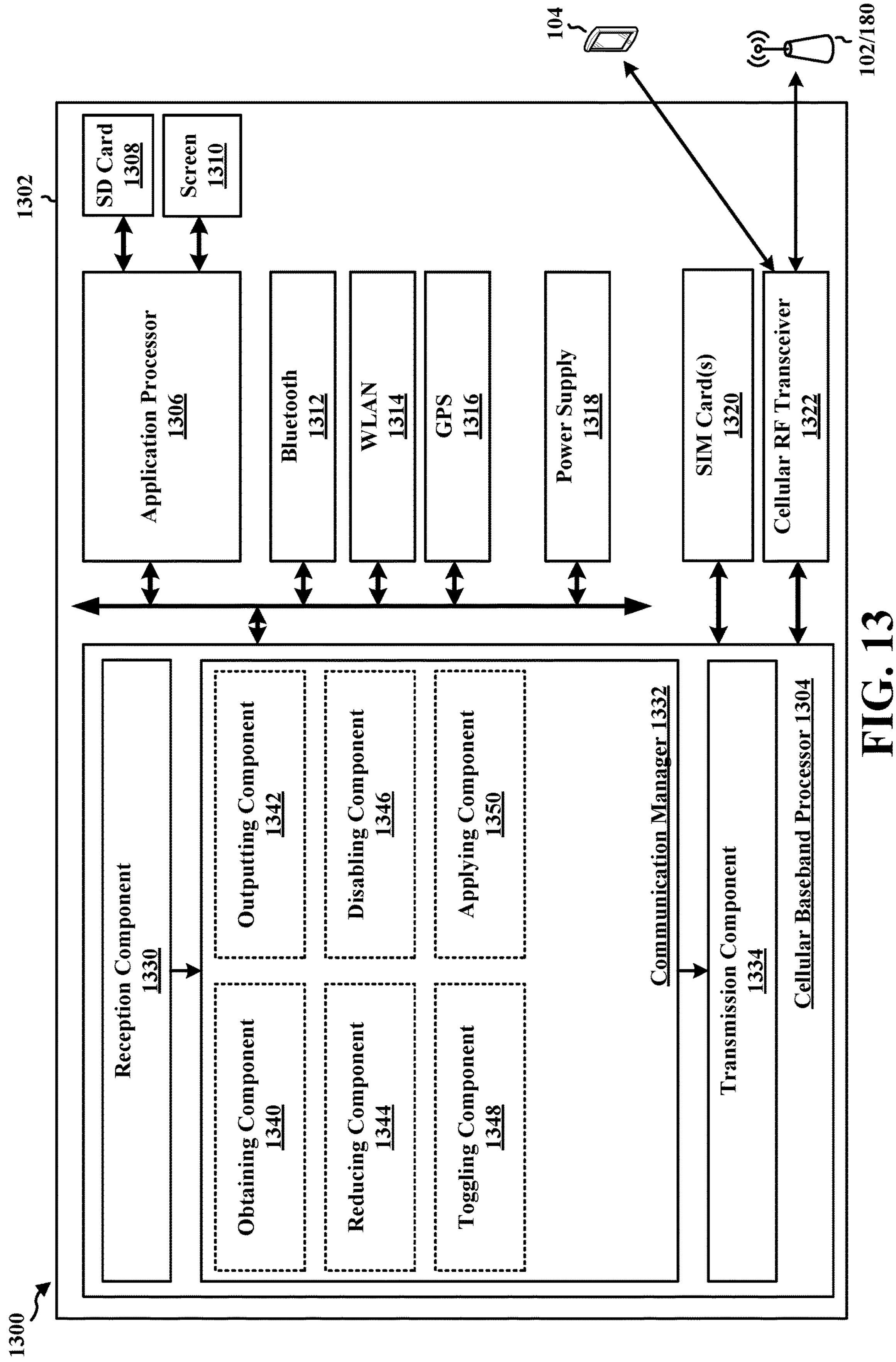
FIG. 13 is a diagram illustrating an example of a hardware implementation for an apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 102/180 and may include the memory 376 and/or at least one of the TX processor 316, the RX processor 370, and the controller/processor 375. In various examples, the apparatus 1302 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively “the processor”); one or more radios (collectively “the radio”); and one or more memories or memory blocks (collectively “the memory”).

The communication manager 1332 includes an obtaining component 1340 configured to obtain, from a first network entity or a second network entity, a message indicating effective isotropic radiated power (EIRP) metrics; and obtain, from the second network entity, parameters indicative of at least a measurement period during which the wireless communication between the apparatus and the one or more UEs are measured based on the EIRP metrics; e.g., as described in connection with 1202 and 1204.

The communication manager 1332 further includes an outputting component 1342 configured to output, for transmission, a first signal within a first symbol using a first beamforming vector, wherein the parameters for the measurement period comprises an indication of the first symbol, and wherein the parameters are further indicative of the first beamforming vector, e.g., as described in connection with 1206.

The communication manager 1332 further includes a reducing component 1344 configured to reduce, via a beam null, spatial emissions of a transmission, wherein the transmission is part of the wireless communications between the apparatus and the one or more UEs; and reduce, via a beam tapering operation, side-lobe levels associated with a transmission, wherein the transmission is part of the wireless communications between the apparatus and the one or more UEs; e.g., as described in connection with 1208 and 1210.

The communication manager 1332 further includes a disabling component 1346 configured to disable one or more codewords of a beamforming codebook used for wireless communications between the apparatus and the one or more UEs; e.g., as described in connection with 1212.

The communication manager 1332 further includes a toggling component 1348 configured to toggle, turn on or off, or reduce power to one or more antenna elements used for wireless communications between the apparatus and the one or more UEs; e.g., as described in connection with 1214.

The apparatus may include additional components that perform each of the blocks of the algorithm in the aforementioned flowchart of FIG. 12. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for obtaining, from a first network entity or a second network entity, a message indicating effective isotropic radiated power (EIRP) metrics; means for applying the EIRP metrics to wireless communications between the apparatus and one or more user equipments (UEs); means for obtaining, from the second network entity, parameters indicative of at least a measurement period during which the wireless communication between the apparatus and the one or more UEs are measured based on the EIRP metrics; means for outputting, for transmission, a first signal within a first symbol using a first beamforming vector, wherein the parameters for the measurement period comprises an indication of the first symbol, and wherein the parameters are further indicative of the first beamforming vector; means for reducing, via a beam null, spatial emissions of a transmission, wherein the transmission is part of the wireless communications between the apparatus and the one or more UEs; means for reducing, via a beam tapering operation, side-lobe levels associated with a transmission, wherein the transmission is part of the wireless communications between the apparatus and the one or more UEs; means for disabling one or more codewords of a beamforming codebook used for wireless communications between the apparatus and the one or more UEs; and means for toggling, turn on or off, or reduce power to one or more antenna elements used for wireless communications between the apparatus and the one or more UEs.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some examples, the means for outputting may include the TX processor 316, transmitter 318TX, and antenna 320. The means for obtaining may include the RX processor 370, receiver 318RX, and antenna 320. The means for reducing, means for disabling, means for applying, and means for toggling may include one or more controllers/processors 375.

ADDITIONAL CONSIDERATIONS

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is method for wireless communication at a wireless node, comprising: outputting, for transmission to a first network entity, a first message configuring the first network entity to apply effective isotropic radiated power (EIRP) metrics to wireless communications between the first network entity and one or more user equipments (UEs); and outputting, for transmission to a second network entity, a second message indicating the EIRP metrics.

Example 2 is the method of example 1, further comprising: obtaining updated EIRP metrics; and outputting, for transmission to one or more of the first network entity or the second network entity, the updated EIRP metrics.

Example 3 is the method of any of examples 1 and 2, wherein the EIRP metrics are at least one of time-dependent EIRP metrics, frequency-dependent EIRP metrics, average-type EIRP metrics, instantaneous-type EIRP metrics, or operational deployment associated with the first network entity's functioning.

Example 4 is the method of any of examples 1-3, wherein the EIRP metrics comprise a first set of EIRP metrics associated with a first frequency range, and second set of EIRP metrics associate with a second frequency range.

Example 5 is the method of any of examples 1-4, wherein the EIRP metrics comprise a first set of EIRP metrics associated with a first time window, and a second set of EIRP metrics associated with a second time window.

Example 6 is the method of any of examples 1-5, further comprising: obtaining, from the second network entity, an indication of whether at least one of the wireless communications between the first network entity and the one or more UEs complies with the EIRP metrics.

Example 7 is a method for wireless communication at a wireless node, comprising: obtaining, from a first network entity, a message indicating effective isotropic radiated power (EIRP) metrics to be applied by a second network entity to wireless communications between the second network entity and one or more user equipments (UEs); and measuring a strength of a signal transmitted from the second network entity, wherein the wireless communications comprise the signal.

Example 8 is the method of example 7, further comprising: outputting, for transmission to the second network entity, parameters for measuring the strength of the signal.

Example 9 is the method of any of examples 7 and 8, wherein the parameters for measuring comprise an indication of at least one symbol within which the signal should be transmitted by the second network entity, and an indication of at least one beamforming vector to be used by the second network entity for transmitting the signal.

Example 10 is the method of example 9, wherein the at least one beamforming vector is defined by a single main lobe in a spatial domain or multiple main lobes in the spatial domain.

Example 11 is the method of any of examples 7-10, further comprising: outputting, for transmission to one or more of the first network entity or the second network entity, an indication of whether the second network entity is complying with the EIRP metrics based on the measured strength of the signal.

Example 12 is a method for wireless communication at a wireless node, comprising: obtaining, from a first network entity or a second network entity, a message indicating effective isotropic radiated power (EIRP) metrics; applying the EIRP metrics to wireless communications between the wireless node and one or more user equipments (UEs); and obtaining, from the second network entity, parameters indicative of at least a measurement period during which the wireless communications between the wireless node and the one or more UEs are measured based on the EIRP metrics.

Example 13 is the method of example 12, further comprising: outputting, for transmission, a first signal within a first symbol using a first beamforming vector, wherein the indication of the measurement period comprises an indication of the first symbol, and wherein the parameters are further indicative of the first beamforming vector.

Example 14 is the method of any of examples 12 and 13, further comprising: reducing, via a beam null, spatial emissions of a transmission, wherein the transmission is part of the wireless communications between the wireless node and the one or more UEs.

Example 15 is the method of any of examples 12-14, further comprising: reducing, via a beam tapering operation, side-lobe levels associated with a transmission, wherein the transmission is part of the wireless communications between the wireless node and the one or more UEs.

Example 16 is the method of any of examples 12-15, further comprising: disabling one or more codewords of a beamforming codebook used for wireless communications between the wireless node and the one or more UEs.

Example 17 is the method of any of examples 12-16, further comprising: toggling between, turn on, turn off, or reduce power to antenna elements used for wireless communications between the wireless node and the one or more UEs. Example 18 is a network entity (e.g., a regulatory body), comprising: a transceiver; one or more memories, individually or in combination, having instructions; and one or more processors, individually or in combination, configured to execute the instructions and cause the network entity to perform a method in accordance with any one of examples 1-6, wherein the transceiver is configured to: transmit the first message; and transmit the second message.

Example 19 is a network entity (e.g., an intermediate node), comprising: a transceiver; one or more memories, individually or in combination, having instructions; and one or more processors, individually or in combination, configured to execute the instructions and cause the network entity to perform a method in accordance with any one of examples 7-11, wherein the transceiver is configured to: receive the message indicating EIRP metrics.

Example 20 is a network entity (e.g., a base station), comprising: a transceiver; one or more memories, individually or in combination, having instructions; and one or more processors, individually or in combination, configured to execute the instructions and cause the network entity to perform a method in accordance with any one of examples 12-17, wherein the transceiver is configured to: receive, from the network node, the ES configuration; and receive the message indicating EIRP metrics; and receive the parameters.

Example 21 is a wireless node for wireless communications, comprising means for performing a method in accordance with any one of examples 1-6.

Example 22 is a wireless node for wireless communications, comprising means for performing a method in accordance with any one of examples 7-11.

Example 23 is a wireless node for wireless communications, comprising means for performing a method in accordance with any one of examples 12-17.

Example 24 is a non-transitory computer-readable medium comprising instructions that, when executed by a wireless node, cause the wireless node to perform a method in accordance with any one of examples 1-6.

Example 25 is a non-transitory computer-readable medium comprising instructions that, when executed by a wireless node, cause the wireless node to perform a method in accordance with any one of examples 7-11.

Example 26 is a non-transitory computer-readable medium comprising instructions that, when executed by a wireless node, cause the wireless node to perform a method in accordance with any one of examples 12-17.

Example 27 is a wireless node for wireless communications, comprising: one or more memories, individually or in combination, having instructions; and one or more processors, individually or in combination, configured to execute the instructions and cause the wireless node to perform a method in accordance with any one of examples 1-6.

Example 28 is a wireless node for wireless communications, comprising: one or more memories, individually or in combination, having instructions; and one or more processors, individually or in combination, configured to execute the instructions and cause the wireless node to perform a method in accordance with any one of examples 7-11.

Example 29 is a wireless node for wireless communications, comprising: one or more memories, individually or in combination, having instructions; and one or more processors, individually or in combination, configured to execute the instructions and cause the wireless node to perform a method in accordance with any one of examples 12-17.

What is claimed is:

1. An apparatus configured for wireless communication, comprising:

one or more memories, individually or in combination, having instructions; and one or more processors, individually or in combination, configured to execute the instructions and cause the apparatus to:

transmit, to a first network entity, a first message configuring the first network entity to apply effective isotropic radiated power (EIRP) metrics to wireless communications between the first network entity and one or more user equipments (UEs); and transmit, to a second network entity, a second message indicating the EIRP metrics.

2. The apparatus of claim 1, wherein the one or more processors, individually or in combination, are further configured to:

receive updated EIRP metrics; and transmit, to one or more of the first network entity or the second network entity, the updated EIRP metrics.

3. The apparatus of claim 1, wherein the EIRP metrics are at least one of time-dependent EIRP metrics, frequency-dependent EIRP metrics, average-type EIRP metrics, instantaneous-type EIRP metrics, or operational deployment associated with the functioning of the first network entity.

4. The apparatus of claim 1, wherein the EIRP metrics comprise a first set of EIRP metrics associated with a first frequency range, and second set of EIRP metrics associated with a second frequency range.

5. The apparatus of claim 1, wherein the EIRP metrics comprise a first set of EIRP metrics associated with a first time window, and a second set of EIRP metrics associated with a second time window.

6. The apparatus of claim 1, wherein the one or more processors, individually or in combination, are further configured to:

receive, from the second network entity, an indication of whether at least one of the wireless communications between the first network entity and the one or more UEs complies with the EIRP metrics.

7. The apparatus of claim 1, further comprising a transceiver configured to:

transmit the first message; and transmit the second message, wherein the apparatus is configured as a regulatory body.

8. A method of wireless communication, comprising:

transmitting, to a first network entity, a first message configuring the first network entity to apply effective isotropic radiated power (EIRP) metrics to wireless communications between the first network entity and one or more user equipments (UEs); and transmitting, to a second network entity, a second message indicating the EIRP metrics.

9. The method of claim 8, further comprising:

receiving updated EIRP metrics; and transmitting, to one or more of the first network entity or the second network entity, the updated EIRP metrics.

10. The method of claim 8, wherein the EIRP metrics are at least one of time-dependent EIRP metrics, frequency-dependent EIRP metrics, average-type EIRP metrics, instantaneous-type EIRP metrics, or operational deployment associated with the functioning of the first network entity.

11. The method of claim 8, wherein the EIRP metrics comprise a first set of EIRP metrics associated with a first frequency range, and second set of EIRP metrics associated with a second frequency range.

12. The method of claim 8, wherein the EIRP metrics comprise a first set of EIRP metrics associated with a first time window, and a second set of EIRP metrics associated with a second time window.

13. The method of claim 8, further comprising:

receiving, from the second network entity, an indication of whether at least one of the wireless communications between the first network entity and the one or more UEs complies with the EIRP metrics.

14. A non-transitory, computer-readable medium comprising instructions that, when executed by one or more processors, are configured to cause the one or more processors to, individually or in combination:

transmit, to a first network entity, a first message configuring the first network entity to apply effective isotropic radiated power (EIRP) metrics to wireless communications between the first network entity and one or more user equipments (UEs); and transmit, to a second network entity, a second message indicating the EIRP metrics.

15. The non-transitory, computer-readable medium of claim 14, wherein the instructions when executed by the one or more processors further causes the one or more processors to, individually or in combination, receive updated EIRP metrics and transmit, to one or more of the first network entity or the second network entity, the updated EIRP metrics.

16. The non-transitory, computer-readable medium of claim 14, wherein the EIRP metrics are at least one of time-dependent EIRP metrics, frequency-dependent EIRP metrics, average-type EIRP metrics, instantaneous-type EIRP metrics, or operational deployment associated with the functioning of the first network entity.

17. The non-transitory, computer-readable medium of claim 14, wherein the EIRP metrics comprise a first set of EIRP metrics associated with a first frequency range, and second set of EIRP metrics associated with a second frequency range.

18. The non-transitory, computer-readable medium of claim 14, wherein the EIRP metrics comprise a first set of EIRP metrics associated with a first time window, and a second set of EIRP metrics associated with a second time window.

19. The non-transitory, computer-readable medium of claim 14, wherein the instructions when executed by the one or more processors further causes the one or more processors to, individually or in combination, receive, from the second network entity, an indication of whether at least one of the wireless communications between the first network entity and the one or more UEs complies with the EIRP metrics.

* * * * *